United States Patent
Giessen et al.

(10) Patent No.: US 9,804,336 B2
(45) Date of Patent: Oct. 31, 2017

(54) METHOD TO CONNECT AN OPTICAL FIBER HAVING A SOLID CORE WITH AN ADDITIONAL OPTICAL FIBER, OPTICAL FIBER HAVING A SOLID CORE WITH JOINING DEVICE AND USE OF A 3D PRINTER

(71) Applicant: Universität Stuttgart, Stuttgart (DE)

(72) Inventors: Harald Giessen, Marnheim (DE); Stefan Kedenburg, Gerlingen (DE); Timo Gissibl, Leonberg (DE); Andy Steinmann, Korntal-Muenchingen (DE)

(73) Assignee: UNIVERSITAT STUTTGART, Stuttgart (DE)

( * ) Notice: Subject to any disclaimer, the term of this patent is extended or adjusted under 35 U.S.C. 154(b) by 0 days.

(21) Appl. No.: 15/074,668

(22) Filed: Mar. 18, 2016

(65) Prior Publication Data
US 2016/0274308 A1 Sep. 22, 2016

(30) Foreign Application Priority Data
Mar. 20, 2015 (DE) .................. 10 2015 003 652

(51) Int. Cl.
*G02B 6/38* (2006.01)
*B33Y 80/00* (2015.01)
*G02B 6/26* (2006.01)

(52) U.S. Cl.
CPC ........... *G02B 6/3802* (2013.01); *G02B 6/262* (2013.01); *B33Y 80/00* (2014.12)

(58) Field of Classification Search
CPC .......................... G02B 6/3801; G02B 6/3802
See application file for complete search history.

(56) References Cited

U.S. PATENT DOCUMENTS

| 2013/0121644 A1 | 5/2013 | White | |
| 2015/0137398 A1* | 5/2015 | Perez | G02B 6/2553 264/1.25 |
| 2016/0202427 A1* | 7/2016 | Smith | G02B 6/3604 385/26 |

FOREIGN PATENT DOCUMENTS

| DE | 10 2007 044 375 A1 | 3/2008 |
| DE | 10 2011 012 484 A1 | 8/2012 |
| WO | WO 2011/141521 A1 | 11/2011 |
| WO | WO 2015/038932 A1 | 3/2015 |

OTHER PUBLICATIONS

Nanoscribe "Spectrum of Applications," http://www.nanoscribe.de/files/2314/5215/6316/Nanoscribe_ApplicationFlyer_V04-2015_web.pdf, Mar. 15, 2016, 16 pages.

* cited by examiner

*Primary Examiner* — Omar R Rojas
(74) *Attorney, Agent, or Firm* — Harrity & Harrity, LLP

(57) ABSTRACT

The present invention relates to a method for connecting a solid core optical fiber (2) with another optical fiber (20), wherein the solid core optical fiber (2) comprises a joining device (10), which is created on one axial end of the solid core optical fiber (2) using a 3D printer and wherein the other optical fiber (20) is incorporated in the joining device (10) via an axial end of the other optical fiber (20), which is thus connected with the solid core optical fiber (2). In addition, the invention relates to a solid core optical fiber (2) with a joining device (10) created by a 3D-printer, and the relevant use of a 3D printer.

11 Claims, 7 Drawing Sheets

METHOD TO CONNECT AN OPTICAL FIBER HAVING A SOLID CORE WITH AN ADDITIONAL OPTICAL FIBER, OPTICAL FIBER HAVING A SOLID CORE WITH JOINING DEVICE AND USE OF A 3D PRINTER

RELATED APPLICATION

This application claims priority to German Patent Application No. 10 2015 003 652.1, filed on Mar. 20, 2015, the content of which is incorporated by reference herein in its entirety.

The invention relates to a method for connecting a solid core optical fiber with another optical fiber, a solid core optical fiber with a joining device, and the related use of a 3D printer.

The joining of optical fibers enables a permanent and stable connection between two fiber parts for the low-loss transmission of light. A requirement for the undisturbed distribution of light is the exact and correlating alignment of the fiber ends on a sub-micrometer scale.

If the optical fibers that are to be connected consist of a solid core fiber and a hollow core fiber, a solid and at the same time non-deformable joining, while maintaining the filling ability of the hollow core fiber with a gaseous or liquid medium, is technically very demanding and has hitherto required complex solutions.

Until now, commercially available fusion splicers have been used for the joining of solid core fibers with hollow core fibers, which are based on the heating of an electric arc or a filament. The fiber ends are temporarily melted and pushed together. Hereby, the fiber end of the solid core fiber is cut obliquely, in order to create a fissure after the splicing process, thus allowing the hollow core fiber to be filled afterwards.

The method of joining by means of fusion splicers has been optimized for the connection of two standardized silica fibers. If different fiber materials are being used, or if the hollow core fiber has a heat-sensitive internal structure or filling, it is very hard to connect the fibers in a non-deformable fashion, as a balanced metering of the required heat exposure is difficult. The reproducibility of splicing with a fissure is extremely limited due to the alignment of an inclined surface and the overlapping tolerances.

Alternative approaches in current research are based on a tapered capillary fiber, which serves as a sleeve, and into which the fibers that are to be connected are inserted from both sides. The filling of the hollow core fiber is done prior to connecting.

A connection that is based on a sleeve using a tapered capillary fiber has the disadvantage of only being able to join together fibers that have exactly the same diameter. In addition, it is very hard for trapped air to escape during the connecting process, which can cause air bubbles in the filled hollow core fiber and lead to greatly increased coupling losses.

It is therefore an objective of the present invention to improve the merging of optical fibers; in particular the joining of two solid core optical fibers and/or connecting a solid core optical fiber with a hollow core optical fiber. A particular objective of the present invention is to provide a joining technique for optical fibers, which is simpler and more flexible in handling than conventional joining techniques.

This objective is achieved by the subject matters of the following claims. Preferred embodiments are subject to the subsidiary claims.

Wherever the term "fiber", "solid core fiber", "hollow core fiber", etc. is used in this description, it always refers to an optical fiber, solid core optical fiber, hollow core optical fiber, etc.

A first independent aspect for solving the objective focuses on a method for connecting a solid core optical fiber with another optical fiber, comprising the steps of:
Creating a joining device on an axial end of the solid core optical fiber using a 3D-printer; and
Connecting an additional optical fiber to the solid core optical fiber by inserting the axial end of another optical fiber into the joining device.

According to another aspect, the invention offers a method of providing a solid core optical fiber with a joining device to connect the solid core optical fiber with another optical fiber, comprising the step of:
Creating a joining device on an axial end of the solid core optical fiber using a 3D-printer.

For the purpose of this description, an "optical fiber" in particular refers to a fiber-optic cable, a dielectric waveguide or a fiber-optic cable which can be used for transmitting light. Hereby, the light in the optical fiber, which is made for example from silica fibers or plastic (polymer optical fiber), is conducted. An optical fiber or optical waveguide is composed of concentric layers. In the center of each optical fiber is a light-transmitting core, surrounded by a sleeve.

In the case of index-guided fibers, the refraction index of the sleeve is less than the refraction index of the core.

However, for the purpose of this description, the term "optical fiber" is not limited to conventional index-guided fibers, but also includes any other type of optical fibers, for example "hollow-core photonic bandgap fibers", which conduct light via the effect of the photonic bandgap. The periodic structure of the airspace in the sleeve of such a fiber creates a photonic bandgap, allowing the light to propagate with frequencies within the bandgap not through the sleeve, but in the fiber core. In contrast to index-guided fibers, there is no condition for hollow-core photonic bandgap fibers that requires the refraction index of the core to be higher than that of the sleeve. A hollow-core photonic bandgap fiber can be a particular embodiment of a hollow core fiber, whose core is preferably filled with air. The core of such a fiber is notably not filled with a special medium that is different from air.

The core and/or sleeve of an optical fiber can be surrounded by other protective layers, especially those made from plastic. Depending on the particular application, the core may have a diameter ranging from several micrometers to several hundred micrometers. If the optical fiber has a hard or solid core, it is an optical hard core fiber or solid core fiber. If, however, the core of the optical fiber has a hollow space, it is a hollow core optical fiber or capillary fiber. The core or hollow space of a hollow core optical fiber can be filled with a gas or liquid. For example, hollow core fibers can be filled with liquids, which have very good nonlinear optical properties for generating a white light/supercontinuum, stimulating Raman scattering or generating midinfrared.

A joining device or joining unit is a device for connecting a solid core optical fiber with another, i.e., a second optical fiber. The other or second optical fiber can be a solid core optical fiber or a hollow core optical fiber. Preferably, the joining device is adapted to receive the axial end or axial end portion of the other optical fiber. In other words, the joining device can be used to connect or link the solid core fiber with the other fiber. In particular, by using the joining device, one axial end of the solid core fiber can be connected or linked to the axial end of the other fiber. Preferably, the joining device is designed as, or represents, a cuff.

The joining device is attached to the solid core fiber or the axial end of a solid core fiber via a 3D-printing technique, i.e. by using a 3D printer or a 3D printing process. Preferably, the 3D printer or the 3D printing process is a 3D lithography system or 3D lithography process, and in particular a 3D laser lithography system or 3D laser lithography process. An example of a 3D printer or 3D printing system is the commercially available 3D laser lithography system "Photonic Professional GT™", developed by Nanoscribe GmbH, which is based on the two-photon polymerization of a UV-curable photoresist. It is understood that in principle other 3D printers or 3D printing methods can also be used.

For the purposes of this description, the term "creating" a joining device comprises the application, manufacturing, fabricating and/or writing, in particular lithographic writing, of the joining device. In other words, the joining device is connected to the solid core fiber or the axial end of a solid core fiber. In particular, the joining device is created in such a way that it becomes firmly, that is to say inextricably, linked with the solid core fiber.

The axial end of a fiber refers to the axial end portion or the axial end section of the fiber.

The connecting or joining of the solid core fiber with another fiber is achieved by inserting or incorporating one axial end of another fiber into the joining device or into a connecting element of the joining device. Preferably, the linking or connecting of the fibers is carried out under a microscope or by means of a camera.

The inventive method offers a simple solution for providing a permanent and stable connection between a solid core optical fiber and another optical fiber, in particular a hollow core optical fiber that is filled or to be filled. By directly creating the joining device by means of a 3D printer, a very high accuracy and reproducibility is ensured. In contrast to conventional methods, such as the splicing method, the inventive method does not require the use of heat, and thus constitutes a very gentle method in regard to the joined fibers. This is particularly beneficial for heat-sensitive fibers, such as chalcogenide fibers, ZBLAN fibers, or other "soft glass" fibers. In addition, the inventive method offers a significant advantage, as the creating of the joining device can be adapted to different fiber sizes and materials. This makes the time-consuming search for the right parameters, e.g. for the splicing process, redundant. The inventive method also reduces the need to "cleave" the end of a fiber at an angle before joining via a fusion splicer is possible. Compared to the splicing process, the inventive method permits the problem-free connection of fibers that consist of different materials.

In a preferred embodiment, the inventive method further comprises strengthening or permanently securing the thus resulting connection between the solid core fiber and the other fiber by means of a droplet of adhesive or glue. The adhesive, for example a drop of a UV adhesive, is preferably applied to the joining device.

In a further preferred embodiment of the inventive method, the other optical fiber is a hollow core fiber or capillary fiber. Preferably, the hollow core fiber or the core of the hollow core fiber is configured to be filled with a fluid, e.g. with a gas and/or liquid. Furthermore, it is preferred that the hollow core fiber or the core of the hollow fiber is filled with a fluid.

Compared to conventional joining methods between a hard core fiber and a hollow core fiber, the inventive method no longer demands that the fiber ends be cut obliquely before the fibers are joined together. Instead, the fibers that are to be connected can be joined in a planar and/or flush fashion with the help of the joining device created or programmed by the 3D printer. This reduces coupling losses at the interface of the joined fibers, and improves the interference-free transmission of the electric field distribution formed in the fiber core (optical waveguide mode) between the joined fibers.

If the other or second fiber is a hollow core fiber, it is advantageous that the hollow core fiber contains or is filled with a fluid prior to assembly, i.e. before the hollow core fiber is inserted or incorporated into the joining device.

Another independent aspect to achieve the objective relates to a solid core optical fiber comprising a joining device for connecting the solid core optical fiber with another optical fiber, whereby the joining device is created by means of a 3D printer or 3D printing system on an axial end of the solid core optical fiber.

By using the inventive solid core optical fiber or the joining device of the solid core optical fiber, a permanent and stable connection between the solid core optical fiber and another optical fiber, in particular a hollow core optical fiber, can be provided with ease. As the joining device is, or will be, created by means of a 3D printer, the properties of the joining device can easily be adapted in a quick and flexible manner to suit the other optical fiber.

In a preferred embodiment of the inventive solid core optical fiber, the joining device includes the following components:
 a base element that is located at one axial end of the solid core optical fiber; and
 a connecting element that is located on the base element and is able to incorporate the axial end of another optical fiber, to thus align the other optical fiber to the solid core optical fiber, and connect the other optical fiber with the solid core optical fiber.

Preferably, the base element is located, in particular flush, at the axial end of the solid core fiber, or connected with or fixed to this. Preferably, the base element and solid core fiber or the axial end of the solid core fiber are fixed, that is inextricably, connected with each other. An "inextricable" connection between two objects generally refers to a compound which cannot be separated without damaging or destroying the objects. In other words, the "inextricable" connection between two objects refers to items that, under normal conditions, are not meant to be separated. In particular, the base element is adapted to stabilize the joining device and/or ensure a stable connection to the solid core fiber or the axial end of the solid core fiber. Furthermore, the connecting element is preferably arranged, in particular flush, to the base element or is connected or fixed to this. Preferably, the connecting element and the base element are fixed, i.e. inextricably connected with each another. The connection between base element and solid core fiber is preferably an adhesive connection, i.e., the inextricable connection is preferably obtained by curing of an adhesive, in particular a UV-curing adhesive. Preferably, the UV-curing photoresist, which is also used for the 3D printing and 3D lithography, is used as an adhesive. In other words, the base element preferably is, or will be, attached to the solid core fiber using an adhesive or photoresist. The joining device, i.e. the combination of a base element and a connecting element is preferably made in one piece.

The connecting element is preferably designed and arranged in such a fashion that an axial end of the other optical fiber can be aligned with the axial end of the solid core optical fiber. Advantageously, the fibers that are to be connected can be aligned in such a way that the cores of the two fibers are exactly adjacent to or aligned with one another. Transmission losses of light between the joined fibers can thus be reduced or minimized, and the transfer of the optical waveguide mode is improved.

In the scope of the present invention it has been discovered that it is necessary for the creation of the joining device by means of the 3D printer to also provide a base element in addition to the connecting element for reasons of stability.

Preferably, the base element is a base plate, i.e. a circular plate, and the connecting element is shaped like a ring. Together, the base plate and the ring form a cuff. Notably, it has been established in the scope of the present invention that it is not possible, or that it is insufficient for reasons of stability, to merely mount the ring laterally onto the solid core fiber. The necessary stability of the joining device or cuff can only be guaranteed by using the base plate.

The thickness of the base element or the base plate is preferably chosen as low as possible, but the necessary stability must be ensured. For example, the thickness of the base element and the base plate can lie in the range of 1 µm to 100 µm, preferably in the range of 3 µm to 50 µm, and most preferably between 5 µm and 20 µm.

The inner diameter of the ring preferably aligns with the outer diameter of the opened, that is, the other or second fiber, or essentially corresponds to it. The outer diameter of the ring is preferably selected as low as possible, but the necessary stability must be ensured. For example, the outer diameter of the ring can be approximately 1.3 to 1.5 times that of the inner diameter. If the inner diameter of the ring is, for example, about 125 µm, the outer diameter of the ring could, for example, be about 175 µm. The height or depth of the ring must be chosen in a fashion that ensures a sufficient contact area with the other fiber that is to be connected. For example, the height or depth of the ring can lie in the range of 10 µm to 100 µm, preferably in the range of 15 µm to 50 µm, and most preferably between 20 µm and 30 µm.

In a further preferred embodiment of the inventive solid core optical fiber, the diameter of the base plate essentially corresponds to the outer diameter of the ring.

Preferably, the ring is arranged on the base plate in such a fashion that the ring and the base plate form a half-open cylinder or a pot. Thereby, this half-open cylinder, i.e. the joining device or cuff, is located on the axial end of the solid core fiber in such a fashion that the opening of the half-open cylinder or pot is facing away from the axial end of the solid core fiber. The base plate is facing the axial end of the solid core fiber.

In a further preferred embodiment of the inventive solid core optical fiber, the connecting element or ring of the joining device comprises one or more air holes through which air, which is trapped, contained or accumulating in the joining device, can escape during the joining of the optical fibers and/or during the filling of the other optical fiber with fluid.

The connecting element can comprise a single air hole through which air can escape, but it can also comprise several air holes, for example two, three, four, five, etc. The at least one air hole is preferably located on the surface of the connection element or ring. More preferably, the at least one air hole borders onto the base element or the base plate. In the case of multiple air holes, they are preferably arranged equidistant along the surface of the connection element or ring.

With the aid of the air holes, the formation of air bubbles, i.e. in a filled hollow core fiber, and thus coupling losses can advantageously be reduced or avoided.

In a further preferred embodiment of the inventive solid core optical fiber, the connecting element or the ring can be chamfered or beveled. In particular, the upper surface of the ring, i.e. the side turned away from the base plate, has a bevel on the inner edge.

The chamfer or bevel of the connecting element or ring helps to better combine the fibers that need to be joined. In particular, the other fiber can be inserted more easily into the connecting element or ring of the joining device and incorporated therein.

Alternatively or additionally, the connecting element or the ring will preferably also have an expansion joint. The expansion joint advantageously ensures that only little or ideally no tension, which can lead to cracks, occurs in the connecting element or in the ring.

In a further preferred embodiment of the inventive solid core optical fiber, the base element or the base plate of the joining device has a core hole and a bar-shaped recess, wherein the bar-shaped recess extends from the core hole to the edge of the base element.

A "core hole" is defined as a hole or an opening in the base element or the base plate, which is located at the same level as the solid core optical fiber, i.e. aligning with the core of the solid core optical fiber. The core hole preferably has a diameter equal to the mode field diameters of the two fibers that are to be connected, that is to say the same as the solid core optical fiber and the other or second fiber. If the mode field diameters of the two fibers that are to be connected are very different, the core hole can be or become formed to such an extent that the diameter of the core hole, in particular linear or wedge-like ones, rises or falls along the connecting direction of the fibers that are to be connected. In other words, the core hole can be "tapered", i.e. become thinner or thicker from one end of the core hole to the other. Thus, coupling losses can be minimized.

The bar-shaped recess can be a complete recess in the base element or the base plate, or just a furrow or a groove in the base element or base plate.

After the fibers are joined, a "bypass" is created between the core of the second fiber and the outside of the joining device by the core hole and the bar-shaped recess in the base element or base plate. This is particularly advantageous when connecting the solid core fiber with a hollow core fiber filled with liquid, because when the solid core fiber and the hollow core fiber filled with liquid are combined, the liquid can flow into the core hole. This reduces or prevents the formation of air bubbles at the interface between the solid core fiber and the second fiber or hollow core fiber. The remaining air is transported to the outside via the bar-shaped recess. A further advantage of the core hole is that between the core of the hard core fiber and the core of the second fiber there is no disturbing material from the joining device. That means that in the assembled state, there is only one interface, for example, gas/liquid, between the solid core fiber and the other fiber. This can reduce or minimize coupling losses between the connected fibers.

In a further preferred embodiment of the inventive solid core optical fiber, the base element of the joining device has one or more step index profile holes. The step index profile holes are preferably arranged in the area of the center of the base element or base plate. The step index profile holes advantageously make it possible to obtain a step index profile analogous to the light conduit in optical fibers. The effective refraction index in the coating of the fiber can be reduced through the air holes or step index profile holes, as air has a lower refraction index than the base element (e.g. a polymer). This way, a step index profile can be produced.

In a further preferred embodiment of the inventive solid core optical fiber, the joining device or cuff is made of a polymer, in particular, a negative resist. Preferably, the polymer is transparent for the light that is transmitted via the fibers. It is further preferable that the joining device or cuff is made of one piece.

Another independent aspect for solving the objective relates to the use of a 3D printer or a 3D printer and/or a 3D printing process for the creation of a joining device on an axial end of a solid core optical fiber. In particular, a 3D-printer and/or a 3D-printing process can be used for providing or producing an inventive solid core optical fiber that features a joining device.

For the above-mentioned further independent aspects and in particular for the preferred embodiments thereof, the explanations of the embodiment of the first aspect, mentioned above or hereinafter, apply. In particular, also the explanations of the embodiments of the respective other aspects, mentioned above or hereinafter, apply for an independent aspect of the present invention and thereto preferred embodiments.

In the following, individual embodiments for solving the objective are explained using figures. Herein, the individually described embodiments in part show features that are not stringently required to perform the claimed subject matter, but provide desirable properties in certain applications. Therefore, also embodiments that are considered technical teachings will be listed, even though they do not possess all features of the embodiments described below. Furthermore, certain characteristics will only be mentioned with regard to individual embodiments described below, in order to avoid unnecessary repetition. Therefore, it should be noted that the individual embodiments do not only stand alone, but should also be considered a synopsis. Based on this synopsis the person skilled in the art will recognize that individual embodiments can also be modified by incorporating single or multiple features of other embodiments. It is suggested that a systematic combination of the different embodiments with one or more characteristics, that are described with respect to other embodiments, may be desirable and useful, and should therefore be seen as taken into consideration as well as covered by the description.

DETAILED DESCRIPTION OF DRAWINGS

Figure 1:
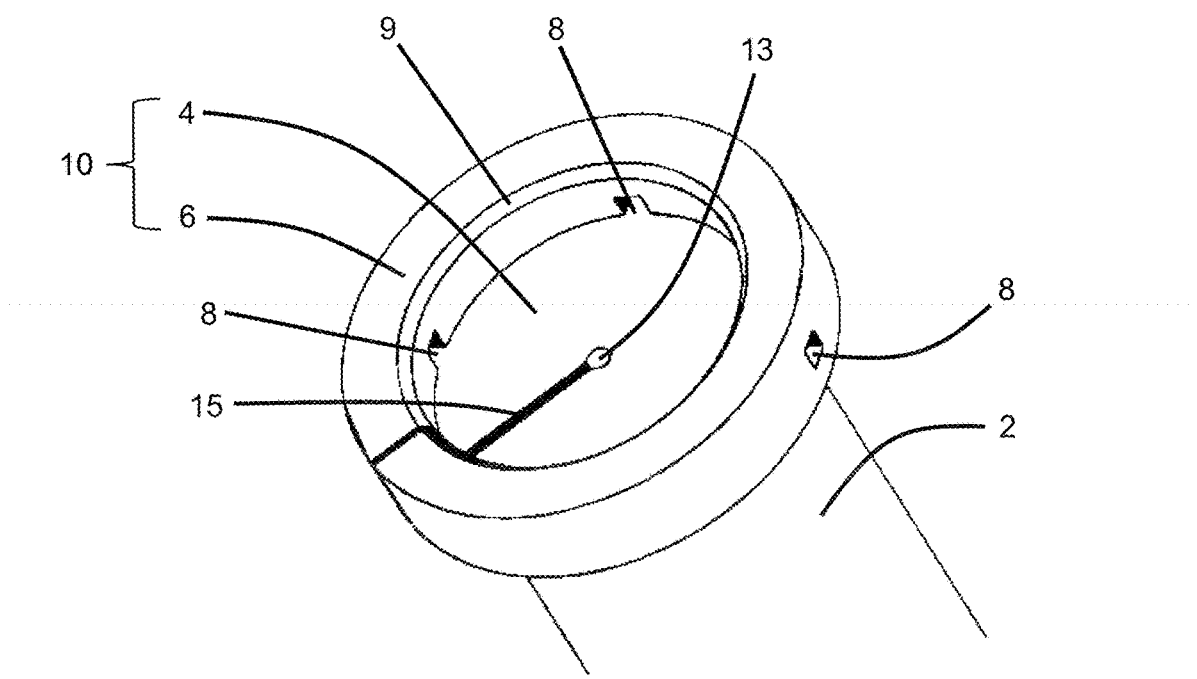
FIG. 1 shows a schematic representation of the inventive solid core optical fiber with a joining device in accordance with a preferred embodiment.

FIG. 1 shows a schematic representation of an inventive solid core optical fiber 2, e.g. a silica fiber, on whose axial end a joining device or cuff 10 made from polymer has been mounted or created by means of a 3D printer. The joining device 10 comprises a base element or a base plate 4 and a connecting element or ring 6. While the base element or base plate 4 ensures a stable connection of the cuff 10 to or with the solid core fiber 2, the connecting element or the ring 6 serves to receive another or second optical fiber, which is to be connected to the solid core optical fiber 2.

The diameter of the base plate 4 corresponds to the outside diameter of ring 6. In the middle of base plate 4 there is a recess, a so-called core hole 13. The diameter of this core hole 13 is adjusted to the mode field diameter of the optical fibers that are to be connected, meaning the solid core optical fiber 2, and another or second optical fiber (not shown in FIG. 1) that it will be connected with. In addition, the base plate 4 has a bar-shaped recess or groove 15, connecting the core hole 13 with the edge of the base plate 4. During the connection of the optical fibers, i.e. when inserting or pushing another optical fiber that is to be connected to solid core optical fiber 2 in or onto cuff 10, core hole 13 and groove 15 can reduce or avoid the formation of bubbles at the interface. If, for example, the optical fiber that is to be connected to the solid core fiber 2 is a liquid-filled hollow core fiber, liquid can stream from the hollow core fiber into the core hole 13 of the base plate 4, while remaining air can escape to the outside through the groove 15. Because of the core hole, the interface between the silica glass fiber 2 and the liquid-filled hollow core fiber is advantageously only made of one transition of glass/liquid, whereas in the absence of a core hole, the interface would consist of two transitions, namely glass/polymer and polymer/liquid. Thus, the core hole also ensures that coupling losses are reduced or minimized.

Ring 6 serves to align and receive the other optical fiber (not shown in FIG. 1). The inner diameter of ring 6 is therefore adapted to match the outer diameter of the other optical fiber that is to be connected to hard core fiber 2. If the other optical fiber is pushed onto cuff 10 or into the ring 6 of cuff 10, the further optical fiber is aligned with the aid of the ring so the cores of the fibers that are to be connected are exactly on top of each other, i.e., aligned adjacent to one another.

As can be seen in FIG. 1, ring 6 has a plurality of air holes or holes from which air can escape 8. With the aid of these air holes 8, trapped air can escape while the fibers are being connected, thus allowing for a better connection of the fibers and reducing coupling losses. In addition, ring 6 has an expansion joint 7 in order to avoid tensions and thus fissures in ring 6.

Figure 2:
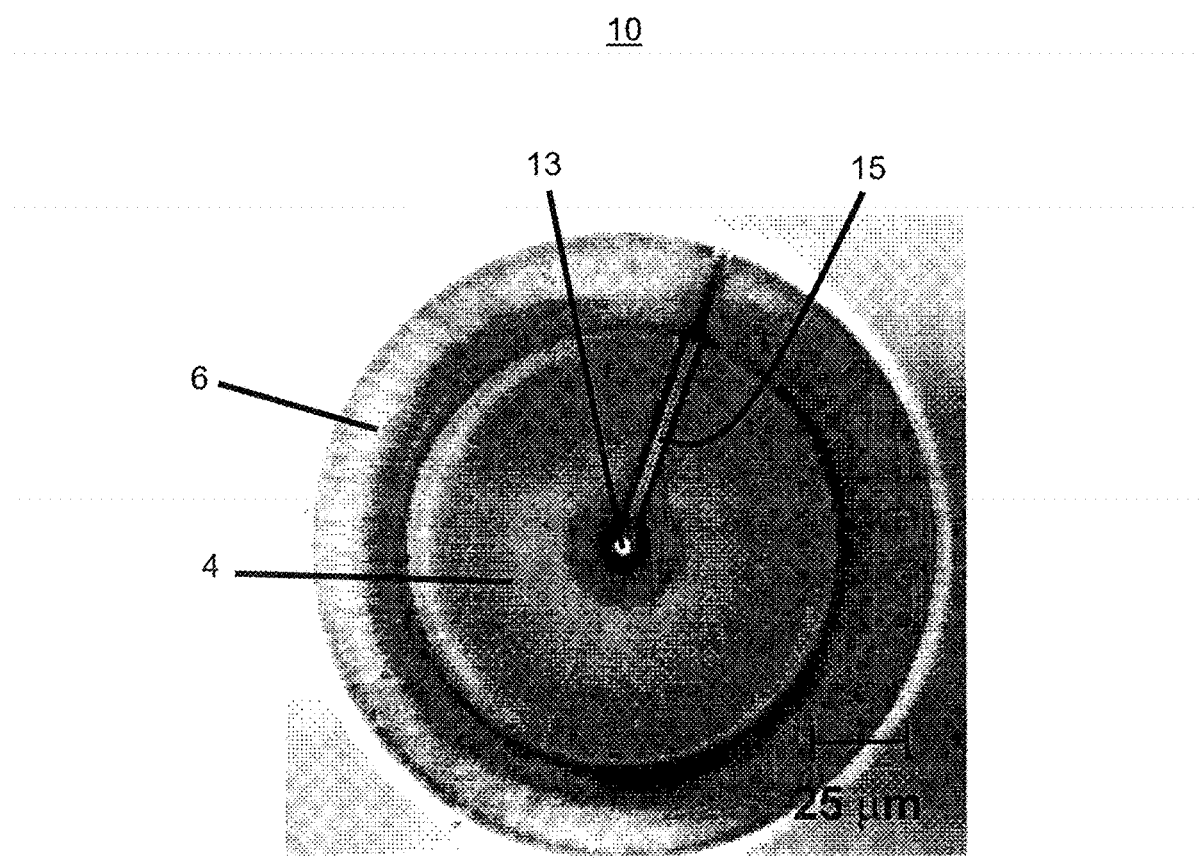
FIG. 2 shows a microscopic image of a top view of a joining device made by a 3D printer in accordance with a preferred embodiment.

FIG. 2 shows a microscopic image of a top view of a joining device or cuff 10 made by a 3D printer in accordance with a preferred embodiment, which is particularly suitable for connecting a hard-core fiber with a liquid-filled hollow core fiber. The base element or base plate 4 with core hole 13 and the bar-shaped recess 15, as well as the connecting element or ring 6, are clearly visible in the microscopic image. The polymer cuff 10 has been mounted onto a solid core optical fiber by a 3D femtosecond laser lithography system.

Figure 3:
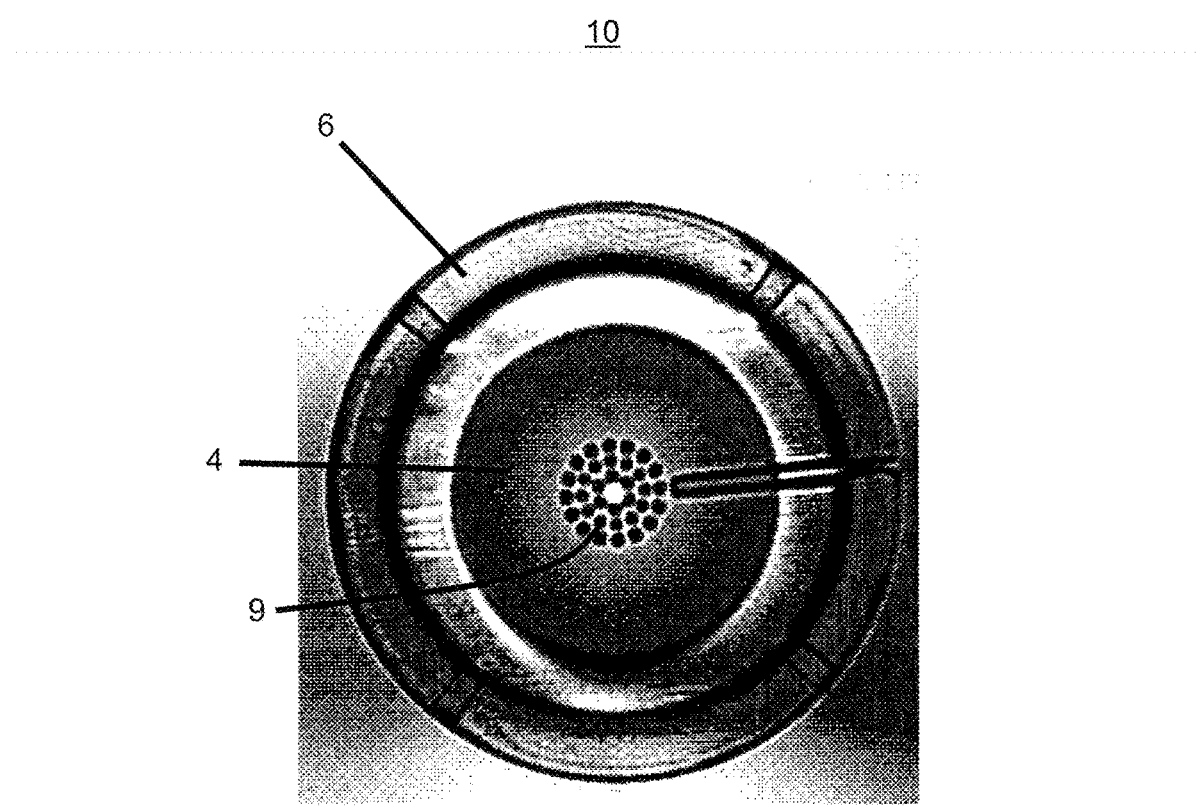
FIG. 3 shows a microscopic image of a top view of a joining device made by a 3D printer in accordance with a further preferred embodiment.

FIG. 3 shows a microscopic image of a top view of a joining device or cuff 10 made by a 3D printer in accordance with a different preferred embodiment, which is particularly suitable for connecting two hard core fibers. The embodiment according to FIG. 3 differs from the embodiment according to FIG. 2 only in the base plate 4. Thus, the base plate 4 in FIG. 3, in contrast to the base plate 4 in FIG. 2, does not have a core hole. The bright ring in the center of base plate 4 shown in FIG. 3 is therefore not a hole, but a core of polymer. However, instead of a core hole, the base plate 4 in FIG. 3 has a plurality of step index profile holes 9, which are arranged around the bright polymer core. The step index profile holes 9 serve to maintain the step index profile. In particular, the air holes or step index profile holes in the fiber coating reduce the effective refraction index of the coating, so that a step index profile, i.e., a higher refractive index in the core than in the coating, results. Although a bar-shaped recess can be seen in base plate 4 in the example of FIG. 3, it is understood that this is not absolutely necessary when combining two hard core fibers, as air can also escape through the air holes or holes from which air can escape in ring 6 when the hard core fibers are being connected.

Figure 4:
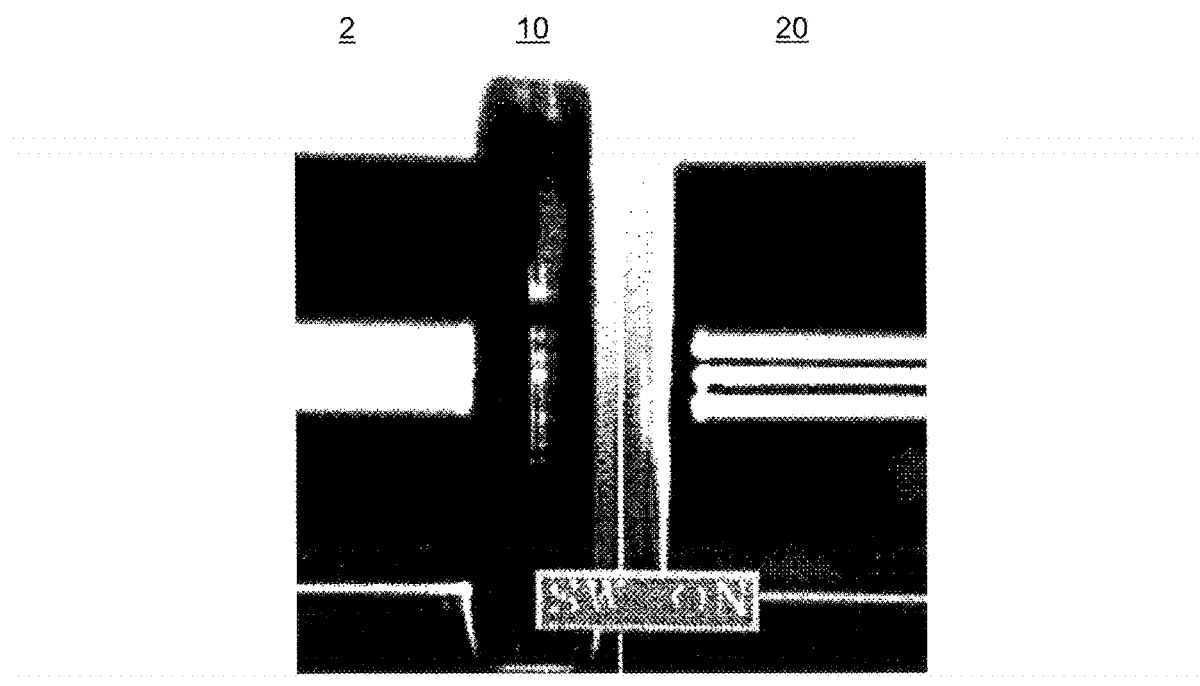
FIG. 4 shows an exemplary microscopic image of the inventive solid core optical fiber before it is connected with a liquid-filled hollow core fiber.

FIG. 4 shows an exemplary microscopic image of a silica glass fiber 2 before it is connected with a liquid-filled hollow core fiber 20 via the polymer cuff 10 mounted on silica fiber 2. The alignment of the silica fiber 2 with cuff 10 and the liquid-filled capillary fiber 20 can preferably be performed using a microscope or a camera. When assembling the fibers through the cuff ring, they are automatically mutually aligned. Preferably, the hollow core fiber 20 is already filled with a fluid, in particular with a liquid, prior to assembly.

Figure 5:
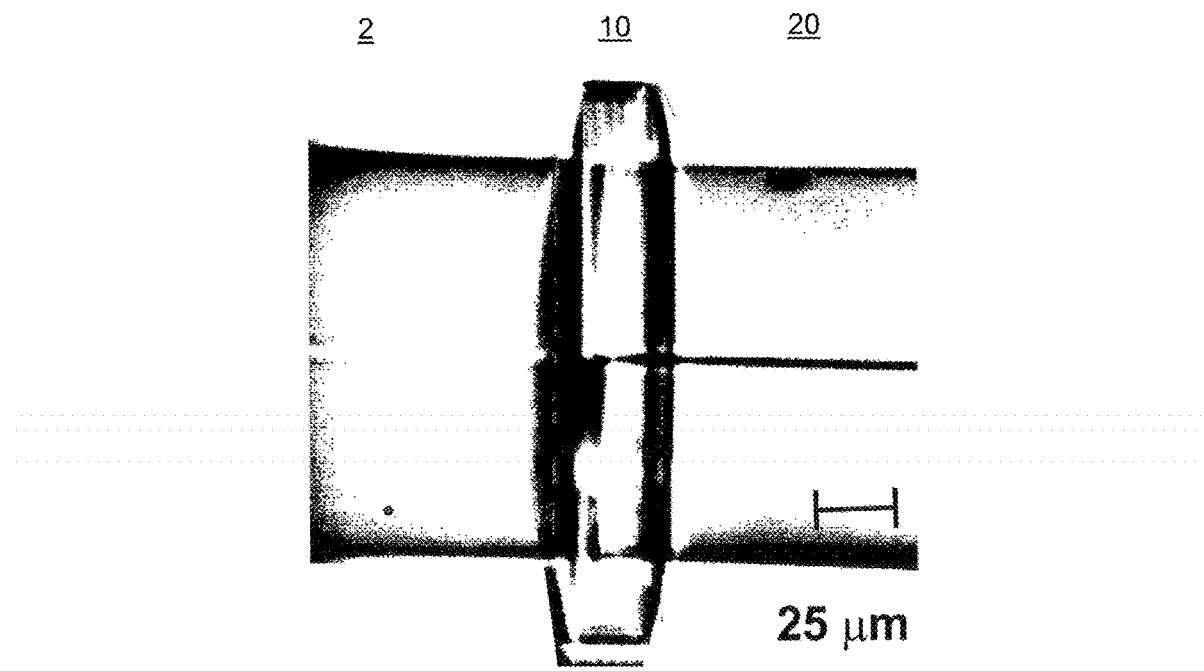
FIG. 5 shows an exemplary microscopic image of the inventive solid core optical fiber, which has been connected to a liquid-filled hollow core fiber, according to an embodiment.

FIG. 5 shows a microscopic image corresponding to FIG. 4 of silica fiber 2 after it has been joined or connected with the fluid-filled hollow core fiber 20 via polymer cuff 10 mounted on silica fiber 2.

Figure 6:
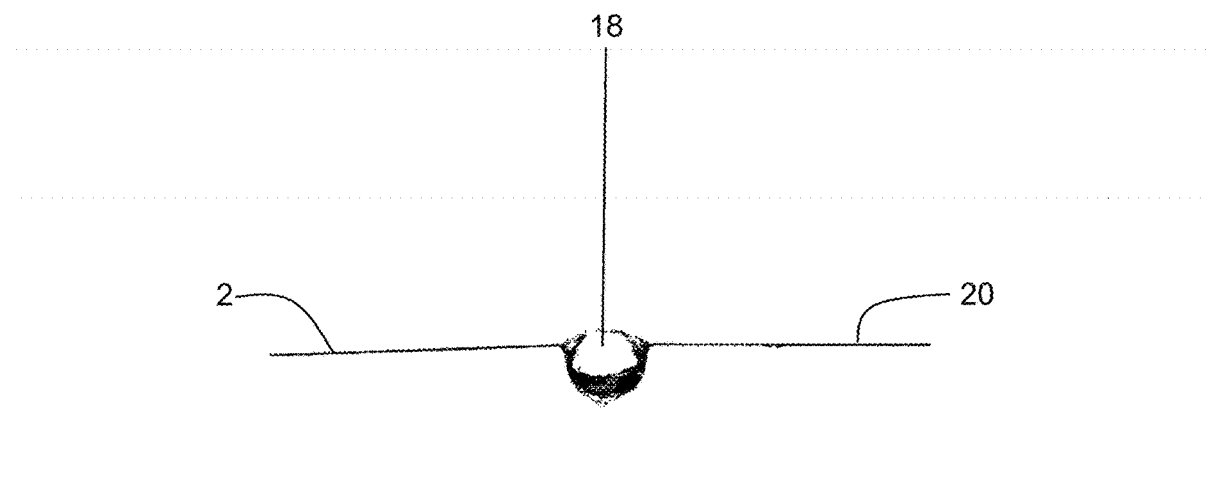
FIG. 6 shows an exemplary microscopic image of the inventive solid core optical fiber, which has been connected to a hollow core fiber filled with liquid, wherein the connection has been reinforced with an adhesive droplet.

To enhance the connection of the two optical fibers or to ensure a permanent fixing of the connection, an adhesive such as a UV adhesive can be dripped onto the joint. A corresponding microscopic image is shown in FIG. 6, in which silica fiber 2, the liquid-filled capillary fiber 20, and the connecting element together with the adhesive droplet 18 is clearly visible. The adhesive droplet 18 surrounds the entire joining device or cuff 10. In FIG. 6, cuff 10 is thus fully covered by the adhesive droplet 18 and thus no longer visible.

Figure 7A:
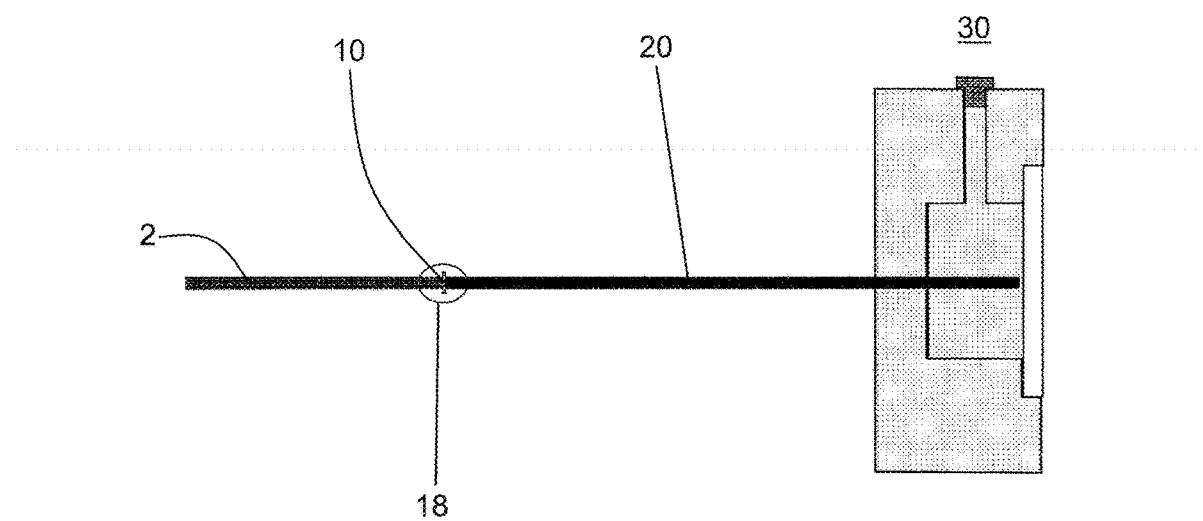
FIG. 7a shows a schematic representation of the inventive solid core optical fiber, which has been connected to a hollow core that is connected to a liquid tank.
Figure 7B:
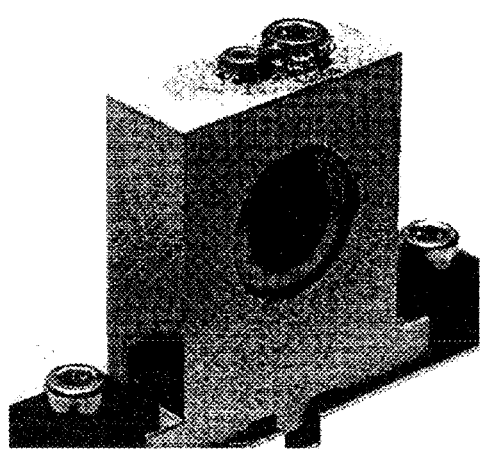
FIG. 7b shows an exemplary photo of a liquid tank, which is used to fill an optical hollow core fiber with liquid.

FIG. 7a shows a schematic representation of the inventive solid core optical fiber 2, which has been connected to a hollow core fiber 20 that is connected to a liquid tank 30 by means of a joining device 10 mounted onto solid core optical fiber 2. The liquid tank 30 supplies the hollow core fiber 20 with liquid over the free axial end of the hollow core fiber, that is through the axial end of the hollow core fiber, which is not connected to the solid core optical fiber. An exemplary photograph of such a liquid tank 30 is shown in FIG. 7b. It is understood that the hollow core fiber 20 or its core can be filled not only with a liquid but also with a gas. In other words, the hollow core fiber can be filled with a fluid, i.e. a liquid and/or a gas.

LIST OF REFERENCE ITEMS

2 Solid core optical fiber/silica fiber
4 Base element/base plate
6 Connecting element/ring
7 Expansion joint
8 Air hole
9 Step index profile hole
10 Joining device/cuff
12 Glue/adhesive droplets
13 Core hole
15 Bar-shaped recess/groove
20 Other or second optical fiber
30 Liquid tank for an optical hollow core fiber

The invention claimed is:

1. A method of connecting a solid core optical fiber with another optical fiber, comprising:
   creating, by a 3D-printer device, a joining device on an axial end of the solid core optical fiber,
      the joining device comprising:
         a base element formed as a plate, and
         a connecting element formed as a ring, and
      the other optical fiber being connected with the solid core optical fiber by inserting an axial end of the other optical fiber into the joining device.

2. The method of claim 1, further comprising:
   utilizing an adhesive to strengthen a resulting connection between the solid core optical fiber and the other optical fiber.

3. The method of claim 1, wherein the other optical fiber is a hollow core fiber.

4. A solid core optical fiber comprising:
   a joining device for connecting the solid core optical fiber with another optical fiber,
      the joining device being created, by a 3D-printer, on an axial end of the solid core optical fiber, and
      the joining device comprising:
         a base element formed as a plate, and
         a connecting element formed as a ring.

5. The solid core optical fiber according to claim 4, wherein the base element is arranged on one axial end of the solid core optical fiber, and
   wherein the connecting element, arranged with the base element, receives an axial end of the other optical fiber so as to align the other optical fiber to the solid core optical fiber and to connect the other optical fiber with the solid core optical fiber.

6. The solid core optical fiber according to claim 4, wherein a diameter of the plate corresponds to an outer diameter of the ring, and the plate is a circular plate.

7. The solid core optical fiber according to claim 4, wherein the connecting element includes one or more air holes through which air, that is trapped, contained, or accumulating in the joining device, can escape when at least one of:
   the solid core optical fiber is being connected with the other optical fiber, or
   the other optical fiber is being filled with fluid.

8. The solid core optical fiber according to claim 4, wherein the connecting element has at least one of:
   a beveled edge, or
   an expansion joint.

9. The solid core optical fiber according to claim 4, wherein the base element has a core hole and a bar-shaped recess,
   the bar-shaped recess extending from the core hole to an edge of the base element.

10. The solid core optical fiber according to claim 4, wherein the base element has one or more step index profile holes.

11. The solid core optical fiber according to claim 4, wherein the joining device is made of a polymer and is made of one piece.

* * * * *